(12) United States Patent
Richter et al.

(10) Patent No.: US 8,570,842 B1
(45) Date of Patent: Oct. 29, 2013

(54) TAR WITH WRITE-SYNCHRONIZED LASER MODULATION

(75) Inventors: Hans J. Richter, Palo Alto, CA (US);
Erhard Schreck, San Jose, CA (US);
Matteo Staffaroni, Pleasanton, CA (US); Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/490,318

(22) Filed: Jun. 6, 2012

(51) Int. Cl.
*G11B 11/00* (2006.01)

(52) U.S. Cl.
USPC ............. 369/13.02; 369/13.22; 369/13.33; 360/29

(58) Field of Classification Search
None
See application file for complete search history.

(56) References Cited

U.S. PATENT DOCUMENTS

| 4,872,078 A | 10/1989 | Gerber et al. |
|---|---|---|
| 5,093,817 A | 3/1992 | Fujii et al. |
| 5,121,369 A | 6/1992 | Makansi |
| 5,450,381 A | 9/1995 | Tsukamura et al. |
| 5,903,533 A | 5/1999 | Horimai |
| 6,246,640 B1 | 6/2001 | Shimazaki et al. |
| 6,856,582 B2 | 2/2005 | Matsuura |
| 2002/0089899 A1 * | 7/2002 | Tani et al. ............ 369/13.14 |

FOREIGN PATENT DOCUMENTS

| JP | 03-205633 A | 9/1991 |
|---|---|---|
| JP | 2006-323932 A | 11/2006 |

* cited by examiner

*Primary Examiner* — Muhammad N Edun
(74) *Attorney, Agent, or Firm* — Patterson & Sheridan, LLP (57) ABSTRACT

Instead of using discontinuous step functions or pulses to drive a laser of a TAR enabled disk drive between on and off, a fixed modulation frequency may be used that alternates between a high and low laser power such that the radiation source is always delivering heat to the magnetic media when writing data to the magnetic disk. The magnetic field of the write pole may be synchronized to the modulation frequency of the radiation source to ensure that the radiation source heats the magnetic media proximate to the write pole above the grain freezing temperature when the Zeeman energy produced by the magnetic field of the write pole exceeds the thermal energy of the magnetic media.

19 Claims, 10 Drawing Sheets

TAR WITH WRITE-SYNCHRONIZED LASER MODULATION

BACKGROUND OF THE INVENTION

1. Field of the Invention

Embodiments of the present invention generally relate to increasing the data bit density in a hard disk drive. Specifically, the invention relates to modulating and synchronizing a radiation source to aid in writing data to high coercivity media.

2. Description of the Related Art

Perpendicular magnetic recording, where the recorded bits are stored in a planar recording layer in a generally perpendicular or out-of-plane orientation (rather than parallel to the surface of the recording layer), is a one path toward ultra-high recording densities in hard disk drives. The perpendicular magnetic recording layer is typically a continuous layer on the disk substrate, like in conventional magnetic recording disk drives. The media comprises a plurality of magnetic elements called grains. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). Accordingly, the magnetic material (or media) of the grains is chosen to have a sufficiently high coercivity such that the magnetized data bits are correctly written and retain their magnetization state until written over by new data bits.

Generally, optical energy may be focused onto a spot of the magnetic material to heat the spot and lower the coercivity of the magnetic material. A write head projects the desired magnetic field through the heated spot which aligns with the grains of the heated spot to the magnetic field. As the spot cools, the coercivity increases and stabilizes the magnetic field of the high-anisotropy layer. Thus, a read sensor is able to pass over the spot, detect the magnetic field, and interpret the bit pattern. This technique is broadly referred to as "thermally assisted (magnetic) recording" (TAR or TAMR), "energy assisted magnetic recording" (EAMR), or "heat-assisted magnetic recording" (HAMR) which are used interchangeably herein.

SUMMARY OF THE INVENTION

The present invention generally to modulating and synchronizing a radiation source to aid in writing data to high coercivity media.

One embodiment discloses a method comprising modulating a radiation source that heats a magnetic media in a hard disk drive where a modulation frequency of the radiation source is greater than a maximum data frequency at which a write pole writes data onto the magnetic media. Moreover, while the write pole writes data to the magnetic media, the modulation frequency is fixed.

Another embodiment discloses a disk drive comprising a radiation source configured to heat a magnetic media in the disk drive and a driver circuit configured to modulate the radiation source where a modulation frequency of the radiation source is greater than a maximum data frequency at which a write pole writes data onto the magnetic media. Moreover, while the write pole writes data to the magnetic media, the modulation frequency is fixed.

Another embodiment discloses a diver circuit for modulating a radiation source configured to heat a magnetic media in a disk drive. The driver circuit includes circuitry configured to generate a signal to modulate the radiation source where a modulation frequency of the radiation source is greater than a maximum data frequency at which a write pole writes data onto the magnetic media. Moreover, while the write pole writes data to the magnetic media, the modulation frequency is fixed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments described herein generally relate to modulating a radiation source (e.g., a gas or solid-state laser) at a fixed modulation frequency while the write pole is writing data to a magnetic disk in the disk drive. Specifically, in one embodiment, the radiation source is modulated at twice the frequency of the maximum data frequency of the write pole. Synchronizing the magnetic field strength of the write pole to the modulation frequency of the radiation source ensures that the radiation source heats the magnetic media proximate to the write pole above a grain freezing temperature when the Zeeman energy produced by the magnetic field of the write pole exceeds the thermal energy of the magnetic grains.

In one embodiment, instead of using discontinuous step functions to drive the laser between on and off, the fixed modulation frequency may alternate between a high and low laser power such that the radiation source is always delivering heat to the magnetic media when writing data to the magnetic disk. Pulsing the radiation source at a fixed frequency where the radiation source is always lasing may prevent mode hopping, reduce fatigue on the elements of an optical transducer, and require less expensive circuit elements.

An Exemplary TAR Hard Drive

Figure 1A:
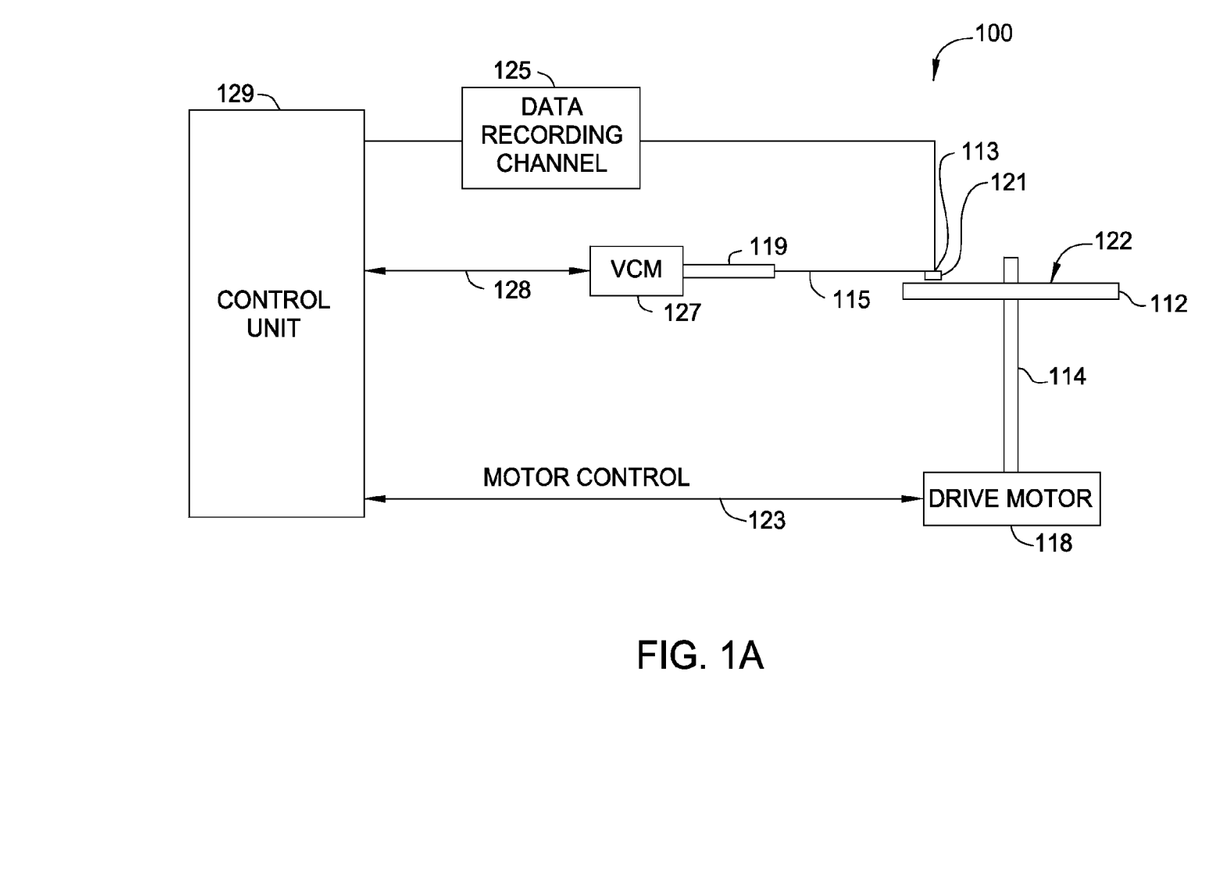
FIGS. 1A-1B illustrate a disk drive system, according to embodiments described herein.

FIG. 1A illustrates a disk drive embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1A may be a voice coil motor (VCM). The VCM comprises a coil movable within a fixed magnetic field, the direction and speed of the coil movements being controlled by the motor current signals supplied by control unit 129.

During operation of a TAR or HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 off and slightly above the disk surface 122 by a small, substantially constant spacing during normal operation. The radiation source heats the high-coercivity media so that the write elements of the magnetic head assemblies 121 may correctly magnetize the data bits in the media.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
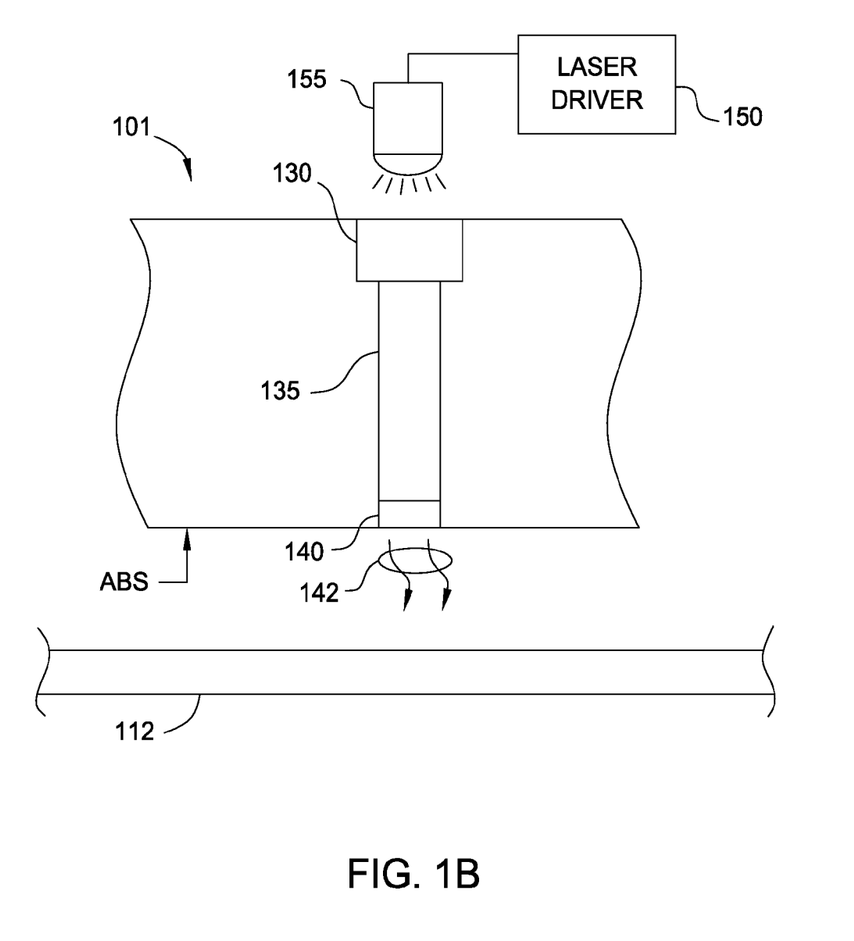

FIG. 1B is a cross sectional schematic of a TAR enabled write head, according to one embodiment described herein. The head 101 is operatively attached to a laser 155 (i.e., a radiation source) that is powered by a laser driver 150. Typically the laser 155 emits light in the near-infrared spectrum around 750-900 nm. The laser 155 may be placed directly on the head 101 or radiation may be delivered from a laser 155 located separate from the slider through an optical fiber or waveguide. Similarly, the laser driver 150 circuitry may be located on the slider 113 or on a system-on-chip (SOC) associated with the disk drive 100 such as the control unit 129 as shown in FIG. 1A and amplified by a preamplifier (not shown). The head 101 includes a spot-size converter 130 for focusing the radiation transmitted by the laser 155 into the waveguide 135. In another embodiment, the head 101 may include one or more lens for focusing the beamspot of the laser 155 before the emitted radiation reaches the spot-size converter 130. The waveguide 135 is a channel that transmits the radiation through the height of the head 101 to the optical transducer 140—e.g., a plasmonic device—which is located at or near the air-bearing surface (ABS). The optical transducer 140 further focuses the beamspot to avoid heating neighboring tracks of data on the disk 112—i.e., creates a beamspot much smaller than the diffraction limit. As shown by arrows 142, this optical energy emits from the optical transducer 140 to the surface of the disk 112 below the ABS of the head 101. The embodiments herein, however, are not limited to any particular type of radiation source or technique for transferring the energy emitted from the radiation source to the ABS.

Figure 2:
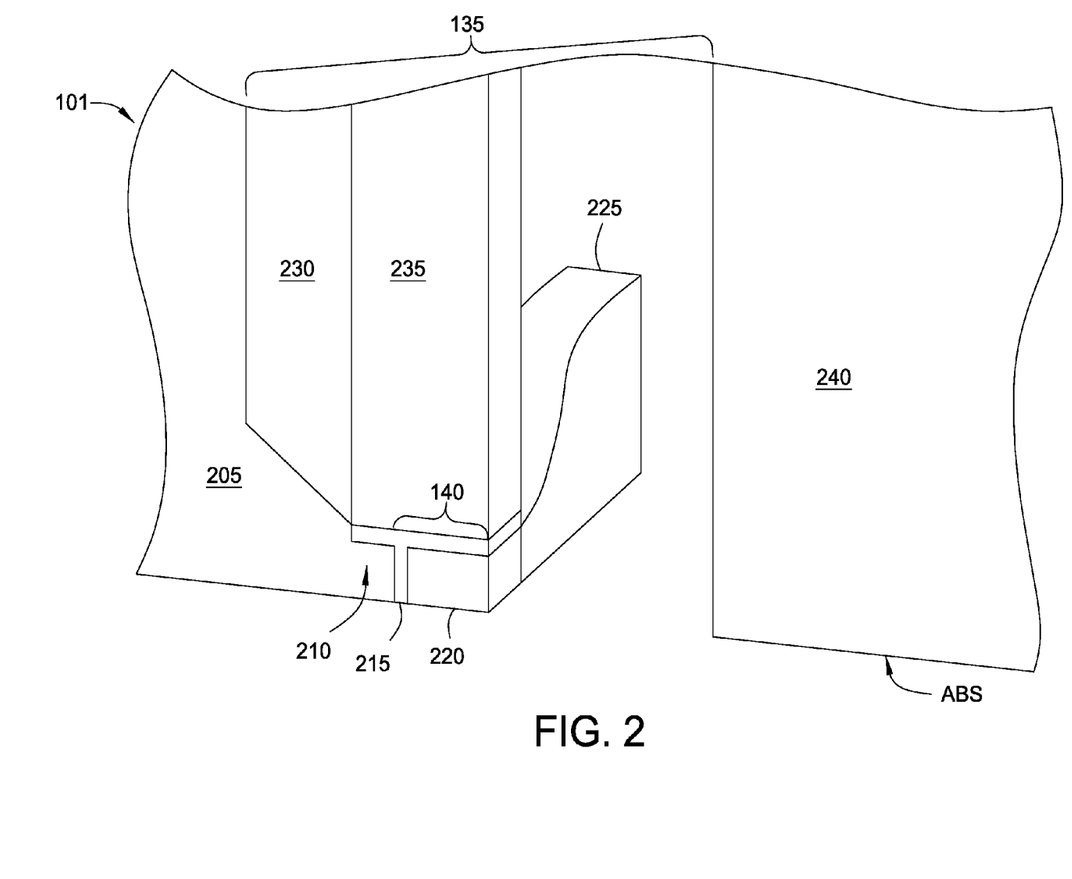
FIG. 2 illustrates a cross-sectional schematic diagram of a TAR enabled head, according to one embodiment described herein.

FIG. 2 illustrates a cross-sectional schematic diagram of a TAR enabled head, according to one embodiment of the invention. As shown, this portion of the head 101 includes the waveguide 135 but with some of the cladding 230 (and any cladding on the back-side of the head 101) removed to better illustrate the details of heat sink 225. The optical transducer 140 may be directly or thermally coupled to the heat sink 225 for removing excess heat from the transducer 140. Because FIG. 2 is a cross-section of head 101, there may be another heat sink located opposite the heat sink 225 depicted. The return pole 240 is located between the transducer 140 and shield layers or the read pole which are not shown in this figure.

In one embodiment, the write pole 205 includes a magnetic lip 210 that may extend underneath the core 235 of the waveguide 135. The magnetic field generated by this lip 210 provides an applied field to orient the grains in a particular direction as the grains cool.

The core 235 (and the waveguide 135) may terminate at the optical transducer 140. The transducer 140 at least includes an antenna 220 and an aperture 215. In some cases, the pole lip 210 may be considered as part of the transducer 140. The antenna 220 may be Cu, Au, Ag, Rh, or alloys thereof. The aperture 215 is an opening that may be filled with radiation-transmissive material such as, for example, $SiO_2$ or other dielectric material. In one embodiment, the aperture 215 may comprise of the same material as the cladding 230. The write pole 205 and pole lip 210 may comprise of Ni, Co, Fe, or some combination or alloy thereof. The transducer 140 uses the antenna 220 to further focus the optical energy delivered by the waveguide 135 onto the magnetic media.

Laser Modulation

Figure 3A:
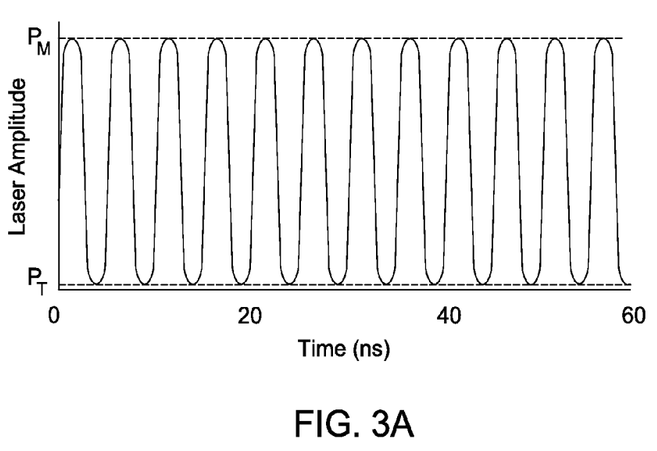
FIGS. 3A-3C illustrate modulating a laser used in a TAR enabled head, according to one embodiment described herein.
Figure 3B:
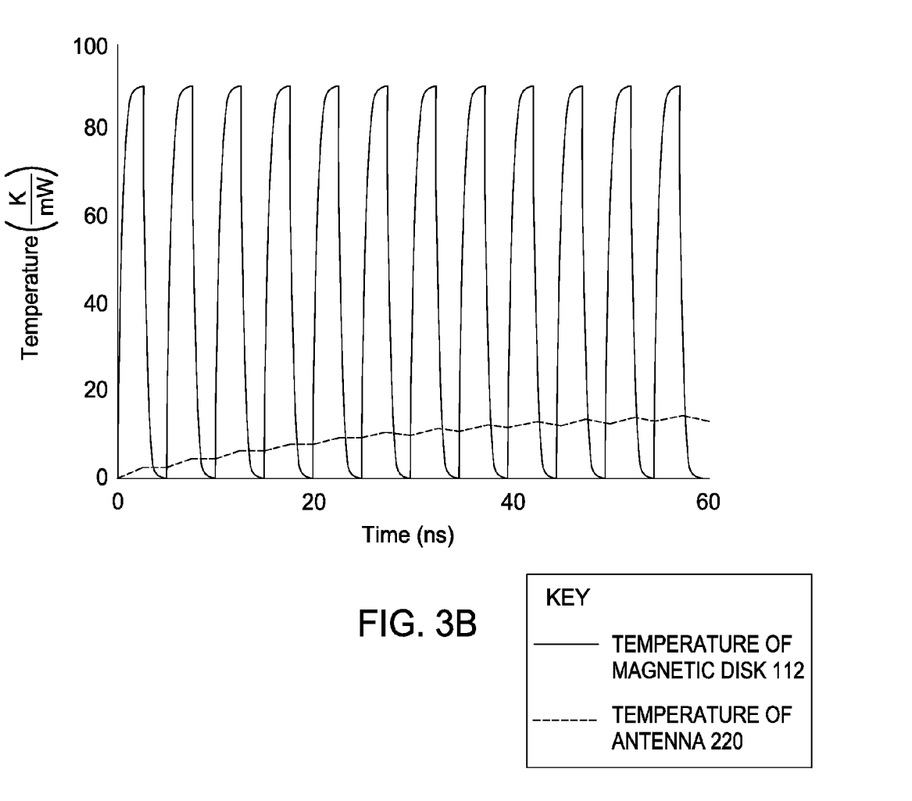
Figure 3C:
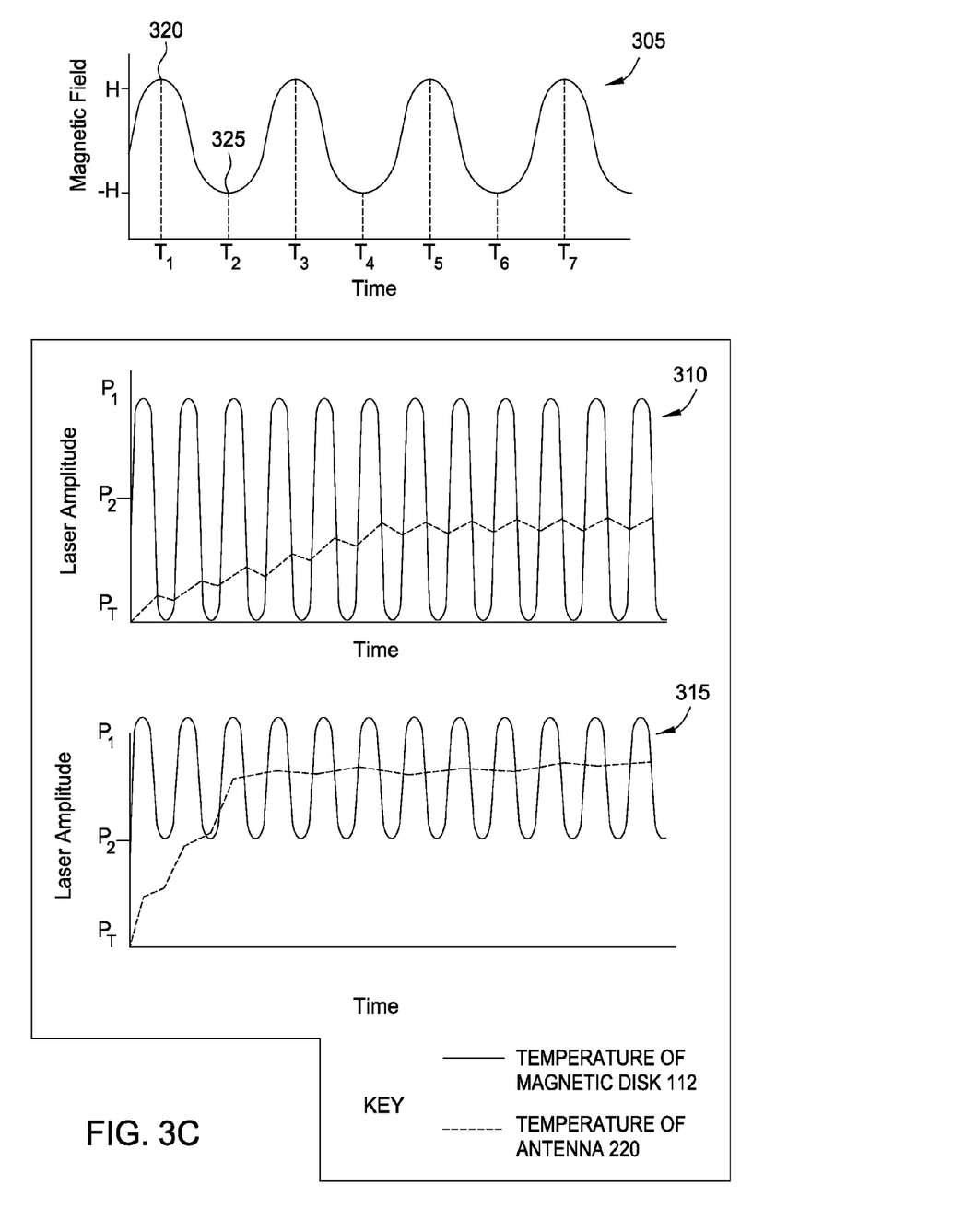

FIGS. 3A-3C illustrate modulating a laser used in a TAR enabled head, according to one embodiment described herein. FIG. 3A illustrates modulating a laser at a fixed modulation frequency. As shown, the laser is driven such that it emits power above its lasing threshold ($P_T$). The lasing threshold is the lowest excitation level at which a laser's output is dominated by stimulated emission rather than by spontaneous emission. Below the lasing threshold the laser may still emit optical energy, however, the emitted power of the laser is orders of magnitude greater once the lasing threshold is crossed. In one embodiment, the laser is driven such that when writing data to the magnetic disk, the emitted power is always above the lasing threshold. Because of the dramatic difference in power emitted by the laser when it is above versus when it is below the lasing threshold, in one embodiment, the laser may be considered as "off" if it is below the lasing threshold. Alternatively, the laser may be modulated below the lasing threshold and still be considered as emitting power.

FIG. 3B illustrates the effect of the power emission of the laser shown in FIG. 3A on the magnetic disk 112 and transducer 140 in FIG. 1B. Specifically, the dotted line illustrates the temperature of the antenna 220 in the transducer 140 of FIG. 2. Comparing FIG. 3B to the emitted laser power in FIG. 3A illustrates that the temperature of the magnetic disk 112 as shown by the solid line responds almost instantaneously to optical energy delivered by the laser (i.e., a fast response time). Stated differently, the temperature of the magnetic disk 112 increases and decreases at substantially the same frequency at which the laser power modulates. This may be desired since it permits the laser to precisely control the temperature of the magnetic disk 112. Although FIG. 3B shows the temperature of the disk 112 cooling completely during each cycle, in reality the temperature of the disk may not reach zero when the laser power is at a minimum (i.e., $P_T$).

In contrast, the dotted line illustrates that the response of the temperature of the antenna 220 is not instantaneous. That is, the rate at which the temperature changes in the antenna 220 when struck by the optical energy is much less than the rate at which the temperature changes in the magnetic disk 112. Because of this slower rate, the temperature of the antenna 220 will increase until it reaches an average between the minimum and maximum temperatures achievable by the laser's power modulation. For example, if the laser power was held constant at the maximum power $P_M$, the temperature of the antenna 220 would be higher than shown in FIG. 3B.

Advantageously, continuously modulating the laser power at the frequency shown means that the temperature of the magnetic media 112 can still be increased above the grain magnetic freezing temperature (i.e., the temperature below which the orientation of the grains in the magnetic disk are not affected by the magnetic field of the write pole) yet the maximum temperature experienced by the antenna 220 is reduced. In one embodiment, the maximum temperature of the antenna 220 is the average temperature. Accordingly, modulating the laser may be preferred over applying a constant laser power (i.e., $P_M$) that would heat the antenna 220 above the temperature reached when the laser is modulated.

FIG. 3C illustrates modulating a laser at a fixed modulation frequency between a lasing state and an off state (i.e., at or below the lasing threshold) versus modulating the laser between the two lasing states. Graph 305 shows a magnetic field of a write pole that may be induced by driving a write current through a coil wrapped around the write pole. In response to the write current, the write pole generates a magnetic field that aligns the grains in the magnetic disk 112. Graph 310 illustrates continuously modulating the laser power between $P_1$ and the lasing power threshold $P_T$ as described previously in FIG. 3A. The temperature of the antenna 220 (i.e., the dotted line) has been superimposed on graph 310 to show that eventually the temperature reaches an average temperature with only minor fluctuations based on the sinusoidal power emission.

Graph 315 illustrates pulsing the laser power between a maximum power and minimum power that is greater than the lasing power threshold ($P_T$). Instead of modulating the laser such it goes from the maximum to the lasing threshold (i.e., being off), the laser's minimum power is, for example, fifty percent less than $P_1$. The dotted line superimposed on graph 315 illustrates the temperature of the antenna 220 based on the smaller modulation range. Comparing the temperature of the antenna 220 in graph 315 to the temperature in 310 shows that the temperature may have less fluctuation which may reduce fatigue on the material of the antenna 220. Moreover, the smaller modulation range may enable the laser driver to be built with less sophisticated (as well as cheaper) components since the modulation range of graph 315 requires less high frequency components. However, the temperature of the antenna 220 in graph 315 may be greater than the temperature of the antenna 220 in graph 310.

Figure 4A:
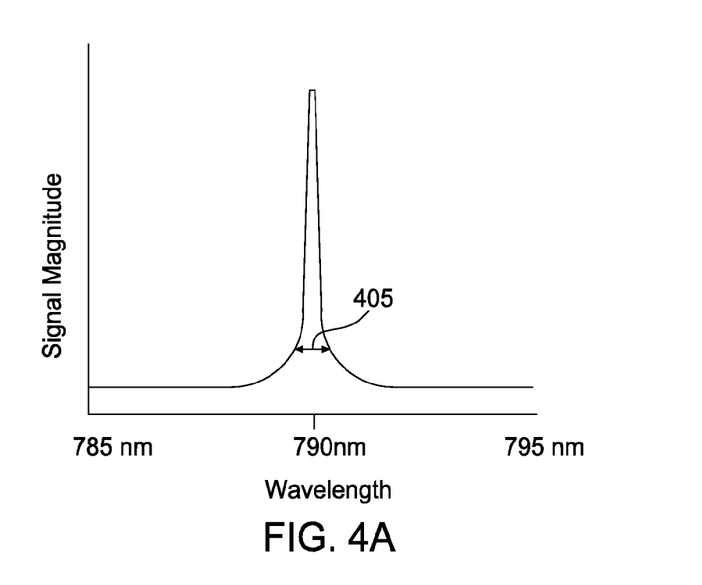
FIGS. 4A-4B illustrate frequency responses for coherent and non-coherent lasers, according to embodiments described herein.
Figure 4B:
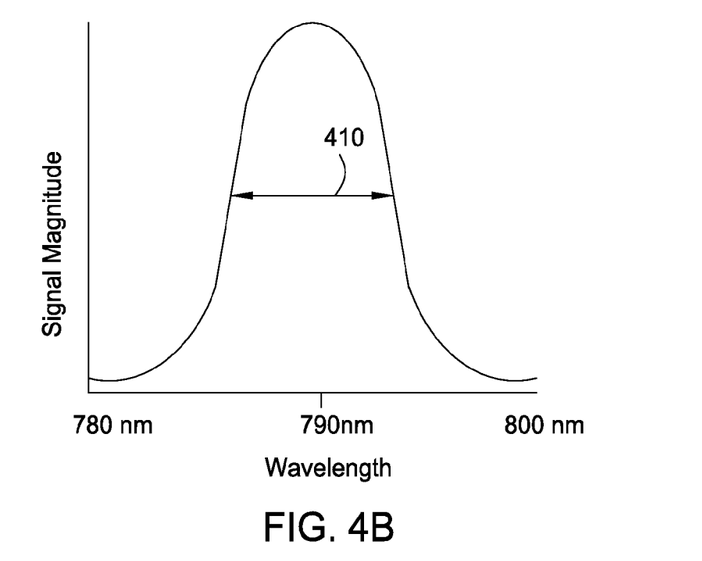

FIGS. 4A-4B illustrate frequency responses for coherent and non-coherent lasers, according to embodiments described herein. In addition to affecting the temperature of the elements of the optical transducer, pulsing (or modulating) may prevent mode hopping. FIG. 4A illustrate the frequency response of a continuous wave laser—i.e., a laser that is DC biased such that it emits a constant power. As shown, the laser emits optical energy at a very narrow frequency range 405 (i.e., the light is coherent). However, a TAR enabled disk drive may be subjected to a phenomenon known as mode hopping.

Mode hopping refers to a semiconductor laser discontinuously switching wavelengths in a back-and-forth manner which may be based on the temperature in, and the length of, the cavity of the laser. Sudden changes in wavelength also change the amount of light that gets reflected at different interfaces in the disk drive. Referring to FIG. 1B, the interface between between the laser and the spot-size converter 130 and the interface between the waveguide 135 and the transducer 140 may cause a certain amount of light emitted from the laser 155 to be reflected back towards the laser 155. Because the amount of light of reflected depends on the wavelength, a sudden change of wavelength because of mode hopping may affect how much light is reflected at these interfaces. If more light is reflected at the interface then less optical energy reaches the disk which may cause the temperature to fall or the thermal spot to shrink.

FIG. 4B illustrates a laser that produces non-coherent light. Pulsing a laser on and off turns the laser into a multi-mode laser that has frequencies in a wider frequency range 410 than the frequency range 405 of coherent light. Because a multi-mode laser emits light in all its modes simultaneously, it does not mode hop. This may ensure that the temperature of the magnetic disk, the thermal spot, and the track width may be predicted and controlled.

The same benefits of pulsing on-and-off may be realized by driving a laser at a fixed modulation frequency as shown, for example, in FIG. 3A. That is, a laser may be modulated such that it is always above the lasing threshold (i.e., not turned completely off) and still avoid the power fluctuations that result from mode hopping. Moreover, if a laser is modulated from a bright intensity to a less bright intensity, but is always emitting light, this may require a less expensive (or less bulky) laser driver circuit than a circuit that pulses the laser from on to off.

Figure 5:
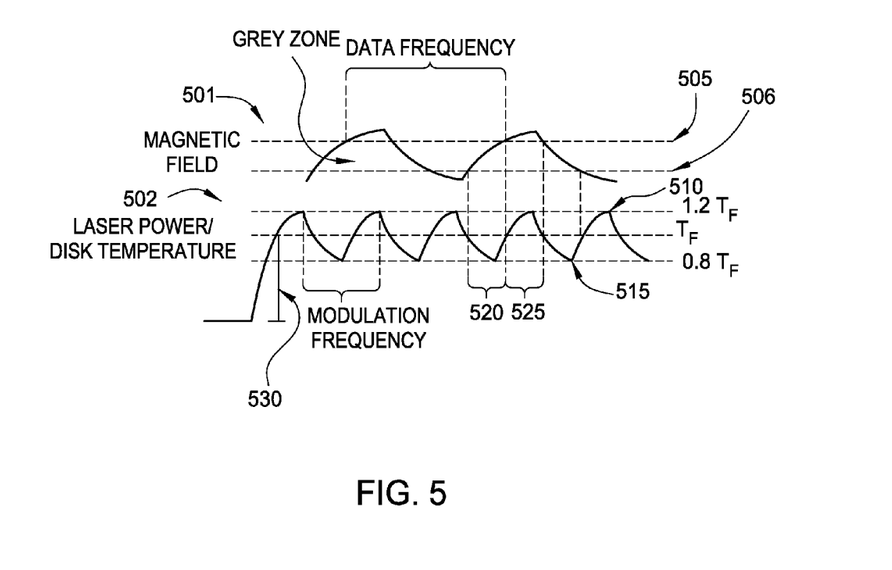
FIG. 5 illustrates modulating a laser's power in a TAR enabled head, according to one embodiment described herein.

FIG. 5 illustrates modulating a laser's power in a TAR enabled head, according to one embodiment described herein. FIG. 5 includes a top graph 501 which illustrates the magnetic field generated by a write pole and a bottom graph 502 that represents the laser power and the temperature of the magnetic disk. That is, the power produced by the laser directly correlates with the temperature of the magnetic disk. Thus, for convenience, they are shown in the same graph 502. Moreover, due to the finite time constant of the disk's thermal response, the laser power and the temperature of the magnetic disk may not follow exactly.

Graph 501 has two thresholds 505, 506 that illustrate when the magnetic field is sufficient to align the majority of the grains in the magnetic media that are within the magnetic field. If the magnetic field exceeds the upper threshold 505 (and the grains are above a freezing temperature), substantially all of the grains of the magnetic media are aligned in a first direction. If the magnetic field is less than the lower threshold 506, substantially all of the grains of the magnetic media are aligned in a second direction that is opposite of the first direction.

The Zeeman splitting energy is the energy difference between a grain aligned with and against an applied magnetic field. The orientation of the grains may is also affected by the thermal energy of the grain. To ensure proper orientation, the Zeeman energy resulting from the magnetic field of the write pole should exceed the thermal energy. Specifically, the thresholds 505, 506 represent when the Zeeman energy is greater than the thermal energy of the grains. In another embodiment, the thresholds 505, 506 may represent where the Zeeman energy is substantially greater than the thermal energy as shown by equation 1.

$$2H_A M_S V \gg k_B T \tag{1}$$

The Zeeman energy is defined by $2H_A M_S V$ where $H_A$ is the applied field $M_S$ is the local magnetization and V is the volume. The thermal energy is defined by $k_B T$ where $k_B$ is the Boltzmann constant and T is the temperature of the magnetic media. If the Zeeman energy is not at least greater than the thermal energy—i.e., the levels defined by the threshold 505, 506—then the orientation of the grains may be random. This random orientation is labeled as the "grey zone" in graph 501 and occurs whenever the magnetic field is between the thresholds 505, 506. Because the Zeeman energy does not exceed the thermal energy, the magnetic field may not be sufficient to align substantially all of the grains in the same direction.

In one embodiment, the grains may not be aligned by the magnetic field even if magnetic field does exceed the thresholds 505, 506. As discussed previously, to increase the data bit area in a magnetic disk, the size of a grain size is shrunk. To avoid instability, however, the grains are made from magnetic materials with higher coercivity. Instead of increasing the magnetic fields generated by the write poles, a laser may be used to temporarily lower the coercivity of the grains by heating them. Once the laser heats the grains above a freezing temperature (also called a blocking temperature), the orientation of the grains may be altered. However, once the grains cool and fall below the freezing temperature, the orientation of the grains is frozen—i.e., the magnetic field produced by a typical write pole is insufficient to change the alignment. Stated differently, even if the magnetic field exceeds one of the threshold 505, 506 but the temperature of the disk is below the freezing temperature, the alignment of the grains cannot be changed by either the applied magnetic field or by thermal fluctuations.

In graph 502, the optical energy emitted by the laser causes the temperature of the magnetic disk proximate to the write pole to modulate between a peak 510 above the freezing temperature ($T_F$) and a trough 515 that is below the freezing temperature. In one embodiment, the magnetic field produced by the write pole (or the write current used to generate the magnetic field) is synchronized to the current that drives the laser. The result of this synchronization is shown in regions 520 and 525. In region 520, the laser power generates a temperature in the magnetic disk that is below the freezing temperature. Advantageously, this region 520 corresponds to when the magnetic field is slewing between aligning the grains in two different orientations. Thus, when the magnetic field is the grey area where the Zeeman energy does not exceed the thermal energy, the grains cannot be aligned. Once the magnetic field crosses the threshold 505 where the Zeeman energy exceeds (or substantially exceeds) the thermal energy, the laser has raised the temperature of the grains above the freezing temperature. Accordingly, because the temperature is above the freezing temperature and the applied magnetic field (i.e., $H_A$) results in a Zeeman energy greater than the thermal energy, the grains are aligned according to the orientation of the magnetic field.

Nonetheless, to ensure the correct orientation of the grains, the critical Zeeman energy is at the time the grains cool past the freezing temperature. The grain magnetization ($M_S$) is zero when the grain temperature is above the Currie temperature and increase as the temperature approaches the freezing temperature. Thus, if all the other variables remain constant, the Zeeman energy increases as the temperature of the grain falls towards the freezing temperature. So long as the applied magnetic field ($H_A$) and a grain magnetization ($M_S$) generate a Zeeman energy strong enough to orient substantially all the grains, then the correct bit pattern is stored in the magnetic media as the grain freezes.

In one embodiment, the modulation frequency of the laser is greater than the data frequency at which the write pole writes data to the disk. In the embodiment shown in FIG. 5, the modulation frequency is twice that of the data frequency. That is, in the time it would take the write pole to align the grains necessary to write two data bits (i.e., a 1 and a 0), the laser has experienced two peaks 510 and two troughs 515—i.e., two complete cycles. Doubling the modulation frequency compared to the data frequency, enables the temperature of the magnetic disk to be above the freezing temperature only when the magnetic field exceeds a threshold 505, 506. However, as will be discussed later, it is not necessary for the magnetic field and the laser power to be precisely synchronized such that once a threshold 505, 506 is exceeded, at that same instant, the temperature of the magnetic media rises above the freezing temperature.

In one embodiment, the strength of the magnetic field plotted in graph 501 does not directly correspond to the current of the write coil that generates the magnetic field in the write pole. For example, the write current might be a square wave that alternates between a positive and negative current. To write one or more first data bits (e.g., a "1") or a plurality of data bits onto the magnetic media, the write current is at a positive current value. To write one or more second data bits (e.g., a "0") the write current is switched to a negative current value. However, because the magnetic material of the write pole may not respond instantly to the write current, the magnetic field slews when the write current transitions from the positive and negative current values (or vice versus) which forms the sawtooth wave shown in graph 501. Specifically, the sawtooth pattern in graph 501 results from the write current alternating continuously between the current values at the maximum data frequency to write alternating bits (e.g., "1010") in the magnetic media. When the magnetic field is above threshold 505, a first data bit is written, when the magnetic field is below the threshold 506, a second data bit is written.

In one embodiment, the laser driver may add a DC offset 530 when driving the laser. Doing so may enable the laser to emit enough power to heat the media above the freezing temperature yet reduce the amplitude of modulation when compared to the laser shown in graph 310 of FIG. 3C. Instead of pulsing a laser from being off to the maximum power emission, the laser driver may provide a DC current that heats the media to the freezing temperature and then modulates the DC current such that the power causes the temperature to fluctuate between $1.2T_F$ and $0.8T_F$ rather than, for example, 0 and $1.2T_F$. Driving a laser to generate a temperature between $1.2T_F$ and $0.8T_F$ may require less expensive or bulky circuitry than a laser driver that can swing the temperature between $1.2T_F$ and 0 at a modulation frequency that is greater than the maximum data rate.

Figure 6A:
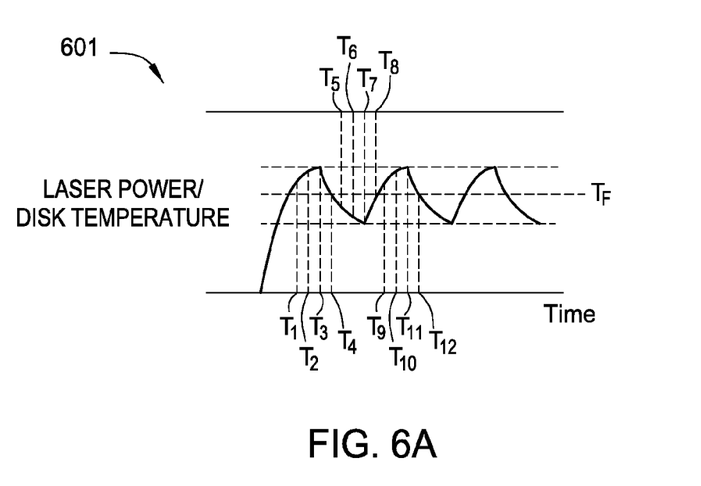
FIGS. 6A-6D illustrate writing data to magnetic media in a TAR enabled head, according to embodiments described herein.

FIGS. 6A-6D illustrate writing data to a magnetic disk in a TAR enabled head, according to embodiments described herein. FIG. 6A illustrates a graph 601 that is based on graph 502 of FIG. 5. The time range $T_1$-$T_{12}$ subdivides into different segments a cycle and a half of the modulation frequency of the laser.

Figure 6B:
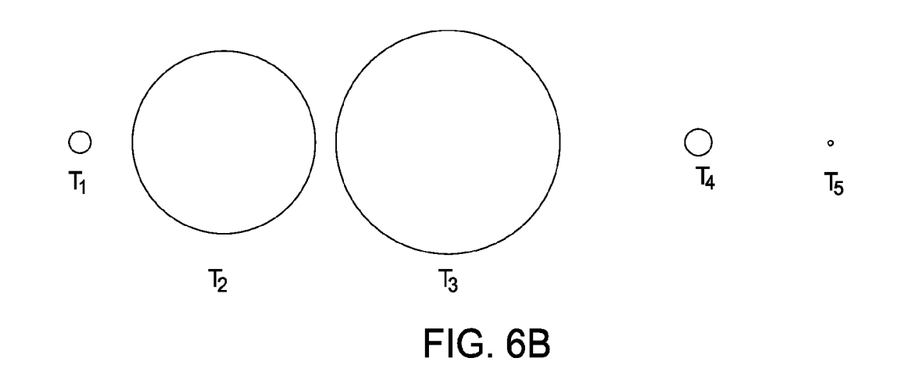

FIG. 6B illustrates the portion of the magnetic media proximate to the write pole that is above the freezing temperature at time $T_1$-$T_4$. Specifically, this portion of the thermal spot is referred to herein as the write bubble. At time $T_1$, the laser has only recently emitted enough power to heat the magnetic media above the freezing temperature. Accordingly, only a small portion of the magnetic media in the thermal spot is above the freezing temperature—i.e., the write bubble is much smaller than the thermal spot. Because the temperature of the magnetic material responds quickly to the power emitted by the laser, at time $T_2$, the write bubble is almost as large as the thermal spot generated by the antenna. At time $T_3$, the power of the laser is at a maximum such that the write bubble and the thermal spot are substantially the same. At time $T_4$, the power of the laser has decreased and the write bubble has shrunk to a small area or point. As the magnetic disk continues to cool, at time $T_5$ (or soon after) almost none of the magnetic media in the thermal spot is above the freezing temperature, and thus, the grains are frozen in their current magnetic orientation. Note that the thermal spot may also increase and decrease slightly as the laser power is modulated.

Figure 6C:
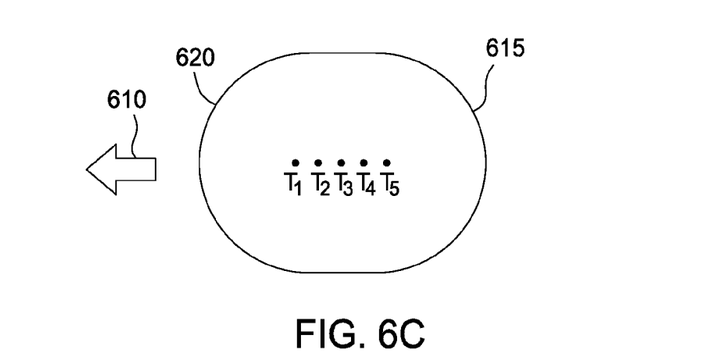

FIG. 6C illustrates the portion of the magnetic media that may be written on a rotating disk. That is, FIG. 6C illustrates how the laser heats the magnetic disk when the disk is moving (i.e., rotating) in the direction shown by the arrow 610. Thus, the view shown in FIG. 6C is at the perspective of the air bearing surface (ABS) of the head looking down onto the magnetic disk. Moreover, the dots label $T_1$-$T_5$ mark the center of the thermal spot of the laser at the disk rotates underneath the ABS.

Furthermore, the speed at which the disk rotates is slower than the rate at which the write bubble expands and contracts. FIG. 6C would change if either the modulation frequency is changed or the disk rotational velocity is altered.

At time $T_1$, the area that is above the freezing temperature is small as shown in FIG. 6B. However, at time $T_2$ that area significantly increases such that the area of the thermal spot above the freezing temperature advances towards the trailing edge 620 of the thermal spot faster than the disk rotates. Thus, even though at time $T_1$ the area above the freezing temperature is small, at $T_2$-$T_4$ the area increases both in a direction towards the trailing edge 620 and the leading edge 615 to create a modified ellipse. This modified ellipse represents an area of the disk where the grains may be changed by the magnetic field of the write pole. Accordingly, if the Zeeman energy of the grains as the grains cool below the freezing temperature exceeds the thermal energy, then the ellipse contains grains substantially oriented in the same direction as provided by the magnetic field. If the laser power and magnetic field are synchronized as shown in FIG. 5 and assuming that the magnetic field affects all the grains in the ellipse, then substantially all the grains in the ellipse will be aligned in the direction dictated by the applied magnetic field.

Figure 6D:
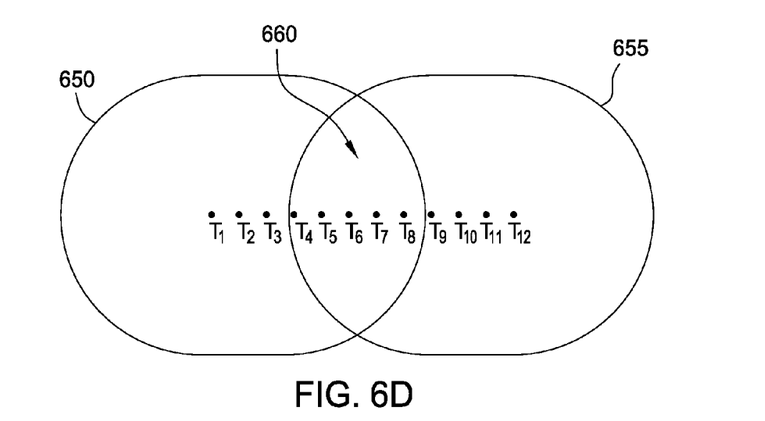

FIG. 6D illustrates an area of a magnetic disk that is heated above the freezing temperature during time $T_1$-$T_{12}$. During time $T_1$-$T_4$, the laser generates an ellipse 650 like the one shown in FIG. 6C. However, during most of time $T_5$-$T_8$, the magnetic media may be below the freezing temperature. During this time range, the orientation of the grains in the disk cannot be changed by either the magnetic field or the thermal energy. Once the laser again exceeds the power needed to raise the temperature above the freezing temperature, at time $T_9$-$T_{12}$ another modified ellipse 655 is made in the magnetic disk.

Assuming the laser power and magnetic field are synchronized as shown in FIG. 5, at time $T_1$-$T_4$, all the grains in ellipse 650 are oriented in the same direction. However, if during $T_9$-$T_{12}$, the magnetic field is the opposite polarity, then all the grains in ellipse 655 are oriented in a direction opposite the orientation of the grains in ellipse 650. Moreover, because ellipse 655 was written later in time, the shared portion 660 of the ellipses is changed from the first orientation of ellipse 650 to the second orientation of ellipse 655. Thus, because of the disk rotational speed and the size of the thermal spot, the leading edge of any particular ellipse (i.e., data bit) may be overwritten by the subsequent ellipse (i.e., data bit).

Figure 7A:
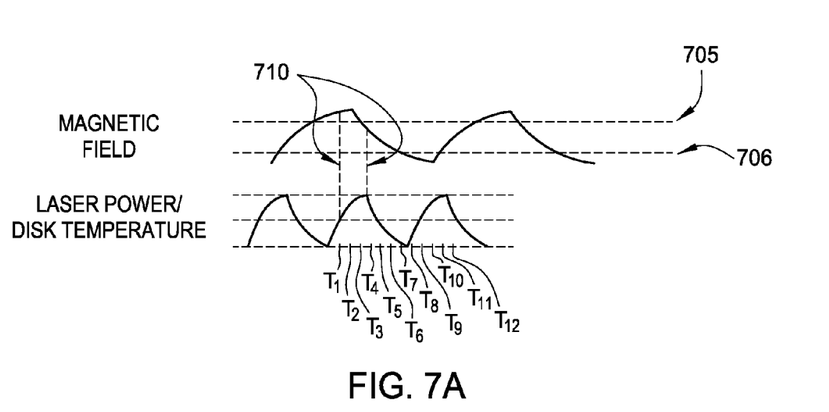
FIGS. 7A-7B illustrate a phase difference between the magnetic field and the laser power, according to embodiments described herein.
Figure 7B:
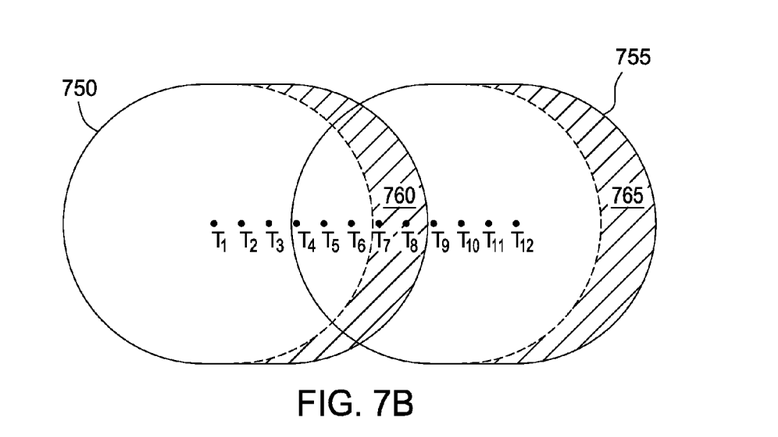

FIGS. 7A-7B illustrate a phase difference between the magnetic field and the laser power, according to embodiments described herein. Specifically, FIGS. 7A-7B illustrate when the laser power/magnetic disk temperature are not precisely aligned with the magnetic field such that once the field exceeds a threshold 705, 706 the temperature of the magnetic disk is above the freezing temperature. As shown by dotted lines 710, the disk temperature is above the freezing temperature for only a portion of the time that the magnetic field exceeds the threshold 705. The same characteristic applies when the magnetic field crosses threshold 706—i.e., the temperature of the magnetic disk is above the freezing temperature for only a portion of the time that the magnetic field exceeds the threshold 706.

FIG. 7B shows the results of writing data to a magnetic disk where the laser power and the magnetic field are not synchronized as explained in FIG. 5. During time $T_1$-$T_4$, the disk temperature is above the freezing temperature. Because the magnetic field exceeds threshold 705, the grains are orientated based on the polarity of the magnetic field. Around time $T_3$, however, the magnetic field falls below threshold 705. This means the Zeeman energy produced by the magnetic field may not be greater than the thermal energy. Accordingly, the orientation of the individuals grains may instead orient based on the thermal energy. Thus, the grains' orientations are unknown. This shaded region of uncertainty 760 (i.e., a grey region) is found at the leading edge of ellipse 750.

During time $T_5$-$T_8$, the temperature of the magnetic disk falls below the freezing temperature, and thus, neither the magnetic field nor the thermal energy affects the orientation of the grains. For example, around time $T_7$ the magnetic field exceeds the threshold 706, but because the grains are frozen, the magnetic field does not change the grains' orientations. During time $T_9$-$T_{12}$, the laser again raises the temperature of the disk above the freezing temperature. Because the magnetic field already exceeds the threshold 706, the trailing edge of ellipse 755 is written with the orientation provided by the magnetic field. Similar to ellipse 750, ellipse 755 also has a grey region 765 where the magnetic disk is above the freezing temperature but the magnetic field no longer exceeds the threshold 706.

Writing a grey portion 760, 765 onto a leading edge of the thermal spots because of the phase difference between the laser power and magnetic field may be acceptable because the trailing edge on the next data bit overwrites this portion. As shown in FIG. 7B, the trailing edge of ellipse 755 overwrites much of the grey region 760 in ellipse 750. Thus, because the trailing edge may overwrite the leading edge of the preceding data bit, in one embodiment, the laser power and magnetic field do not need to be precisely synchronized as shown in FIG. 5.

Further, in one embodiment, the magnetic field and laser power may be synchronized such that the disk temperature is above the freezing temperature when the magnetic field transitions to a field strength that no longer exceeds a threshold 705, 706 to ensure that the trailing edge overwrites the grey zone of the preceding data bit.

Figure 8A:
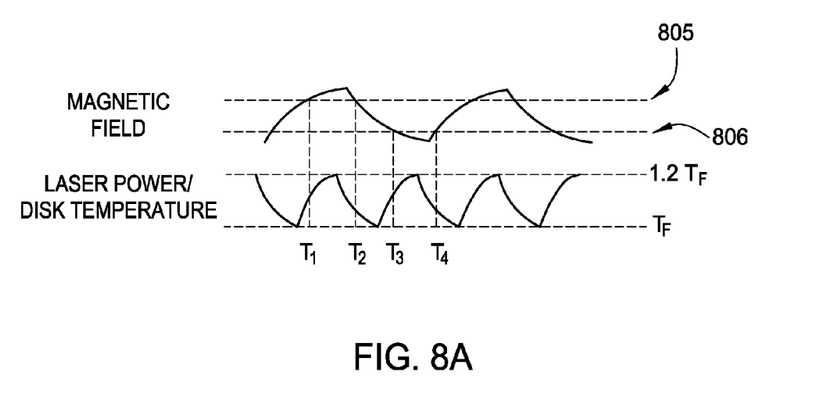
FIGS. 8A-8B illustrate modulating a laser above the freezing temperature, according to embodiments described herein.
Figure 8B:
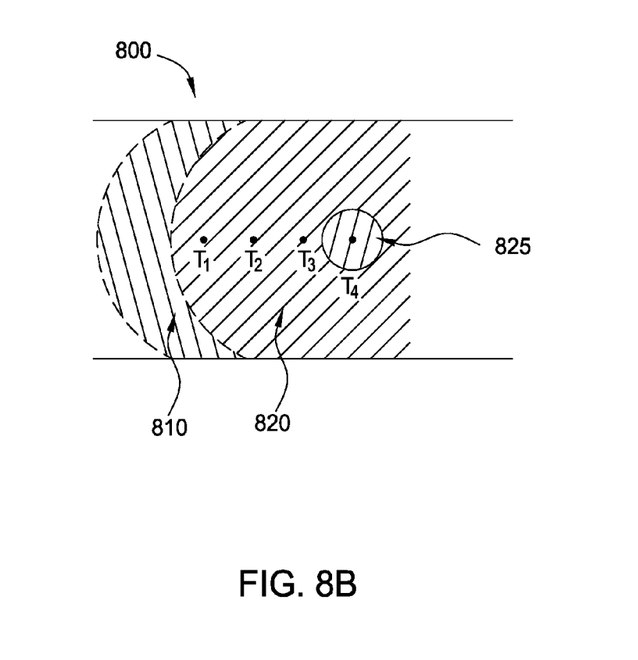

FIGS. 8A-8B illustrate modulating a laser above the freezing temperature, according to embodiments described herein. FIG. 8A illustrates that the laser holds the peak disk temperature (which is typically at the center of the thermal spot) above the freezing temperature (e.g., between $T_F$ and $1.2T_F$) the entire time the write pole is writing to the magnetic disk. Thus, the center of the thermal spot remains always remains above the $T_F$. The area of the thermal spot surrounding the center, however, may continue to fluctuate above and below the $T_F$. Accordingly, the write bubble (i.e., the portion of the thermal spot that is above the TF) is a small point when the laser is at a minimum and may be the size of the thermal spot when the laser is at a maximum.

FIG. 8B illustrates an ideal form 800 where the different ellipses have been omitted for clarity. Here, the grains are not frozen until they move outside of the thermal spot of the laser and fall below the freezing temperature. Thus, the magnetic field and the thermal energy may constantly change the orientation of the grains within the beam spot.

During time $T_1$-$T_2$, the magnetic field is above threshold 805, thereby orienting the majority of the magnetic grains to the magnetic field of the write pole. First data region 810 shows at least a portion of the grains written during this time period. During time $T_2$-$T_3$, the magnetic field does not exceed either of the threshold 805, 806, thereby creating a grey region 815. However, because during this time the laser power is at or near its minimum, the write bubble has also constricted. Accordingly, much of the data region 810 remains unchanged during the $T_2$-$T_3$ time period. That is, only a small portion of data region 810 will be a grey region.

During time $T_3$-$T_4$, the magnetic field exceeds threshold 806, and thus, any grains above the freezing temperature are aligned according to the magnetic field of the write pole to generate a second data region 820. Moreover, during this time period, the laser is at or near its maximum power which generates a write bubble at or near the size of the thermal spot. Here, the disk's rotational speed is such that the second data region 820 overwrites substantially all of the grey region that may have formed during time $T_2$-$T_3$ (unlike in FIG. 7B where a small portion of the grey region may remain depending on the speed of the disk's rotation). After $T_4$, the magnetic field no longer exceeds threshold 806 and the write bubble may have shrunk significantly thereby resulting in another small grey region 825 within data region 820 that is eventually overwritten the next time the write current exceeds the thresholds 805, 806 and the write bubble expands. Accordingly, in one embodiment, the laser power may be modulated when writing data to the disk such that at least a portion of the magnetic disk within the thermal spot is maintained above the freezing temperature. Moreover, only the grains at the trailing edge of the thermal spot (i.e., the crescents) form the bits stored in the magnetic media. Because of the rotational speed of the disk, the magnetic media at the leading edge of the thermal spot is overwritten by the subsequent data bit.

In one embodiment, for at least some portion of time, the laser modulation frequency and the applied magnetic field are synchronized such that the laser heats a portion of the magnetic media above the freezing temperature and below the Currie temperature while the applied field exceeds one of the thresholds 805, 806. In one embodiment, the frequency and applied magnetic field are synchronized such that before the temperature of the magnetic media in the thermal spot decreases below the Freezing temperature, the applied magnetic field exceeds threshold 805 or threshold 806.

As shown in FIGS. 5, 6A, 7A, and 8A, the temperature of the disk may have a maximum of $1.2T_F$ or a minimum of $0.8T_F$, but these ranges are for illustration only and may be modified as desired. In other embodiments, the laser power may be modulated to create temperatures that are smaller or larger than this range. Further, in one embodiment, the maximum temperature of the disk (e.g., $1.2T_F$) may exceed the Currie Temperature (i.e., a temperature at which the grains in the magnetic disk are no longer magnetic, and thus, are not affected by the magnetic field produced by the write pole). For example, so long as there is at least some portion of time when the temperature of the magnetic disk is between the Currie temperature and the freezing temperature and the magnetic field exceeds the thresholds shown in the Figures, data may still be properly written onto the magnetic disk.

CONCLUSION

Embodiments described herein generally relate to modulating a radiation source (e.g., a gas or solid-state laser) at a fixed modulation frequency while the write pole is writing data to a magnetic disk in the disk drive. Specifically, in one embodiment, the radiation source is modulated at twice the frequency of the maximum data frequency of the write pole. Synchronizing the magnetic field strength of the write pole to the modulation frequency of the radiation source ensures that the radiation source heats the magnetic media proximate to the write pole above a grain freezing temperature when the Zeeman energy produced by the magnetic field of the write pole exceeds the thermal energy of the magnetic media.

Instead of using discontinuous step functions or pulses to drive the laser between on and off, the fixed modulation frequency may alternate between a high and low lasing power such that the radiation source is always delivering heat to the magnetic media when writing data to the magnetic disk. Modulating the radiation source at a fixed frequency where the radiation source is always lasing may prevent mode hopping, reduce fatigue on the elements of an optical transducer, and require less expensive circuit elements.

While the foregoing is directed to embodiments of the present invention, other and further embodiments of the invention may be devised without departing from the basic scope thereof, and the scope thereof is determined by the claims that follow.

What is claimed is:

1. A method for performing thermal assisted recording in a hard disk, comprising:
   modulating a radiation source that heats a magnetic media in the hard disk drive, wherein a modulation frequency of the radiation source is greater than a maximum data frequency at which a write pole writes data onto the magnetic media, and wherein, while the write pole writes data to the magnetic media, the modulation frequency is fixed; and
   biasing the radiation source with a DC current thereby providing a DC bias to the modulation frequency.

2. The method of claim 1, wherein the modulation frequency is greater than or equal to twice the maximum data frequency at which the write pole writes data onto the magnetic media.

3. The method of claim 1, wherein, while modulating the radiation source, driving the radiation source such that it constantly delivers heat to a portion of the magnetic media proximate to the write pole.

4. The method of claim 1, wherein the radiation source is a laser, and wherein, while modulating the laser, the laser is constantly driven above a lasing threshold.

5. The method of claim 1, wherein at a peak of the modulation frequency the radiation source heats a portion of the magnetic media proximate to the write pole to a temperature above a grain freezing temperature, and at a trough of the fixed modulation frequency, the radiation source heats the portion of the magnetic media at a temperature below the grain freezing temperature.

6. The method of claim 1, further comprising, synchronizing the fixed modulation frequency to a magnetic field produced by the write pole such that, during a period of time, the radiation source heats a portion of the magnetic media proximate to the write pole above a grain freezing temperature when an energy produced by the magnetic field exceeds the thermal energy ($k_BT$) of grains in the magnetic media.

7. The method of claim 6, wherein, during a different period of time, the radiation source heats a portion of the magnetic media proximate to the write pole below a grain freezing temperature when an energy produced by the magnetic field is less than the thermal energy ($k_BT$) in the magnetic media.

8. The method of claim 1, wherein, while being modulated at the fixed modulation frequency, the radiation source continuously maintains a temperature of a portion of the magnetic media proximate to the write pole above a grain freezing temperature.

9. The method of claim 1, wherein the fixed modulation frequency is characterized by one of: a substantially sinusoidal shape and a substantially sawtooth shape.

10. A disk drive configured to perform thermal assisted recording, comprising:
    a radiation source configured to heat a magnetic media in the disk drive;
    a driver circuit configured to modulate the radiation source, wherein a modulation frequency of the radiation source is greater than a maximum data frequency at which a write pole writes data onto the magnetic media, and wherein, while the write pole writes data to the magnetic media, the modulation frequency is fixed, the driver circuit is configured to bias the radiation source with a DC current thereby providing a DC bias to the modulation frequency.

11. The disk drive of claim 10, wherein the modulation frequency is greater than or equal to twice the maximum data frequency at which the write pole writes data onto the magnetic media.

12. The disk drive of claim 10, wherein, while modulating the radiation source, the radiation source constantly delivers heat to a portion of the magnetic media proximate to the write pole.

13. The disk drive of claim 10, wherein the radiation source is a laser, and wherein, while modulating the laser, the laser is constantly driven above a lasing threshold.

14. The disk drive of claim 10, wherein, at a peak of the modulation frequency, the radiation source heats a portion of the magnetic media proximate to the write pole to a temperature above a grain freezing temperature, and at a trough of the fixed modulation frequency, the radiation source heats the portion of the magnetic media at a temperature below the grain freezing temperature.

15. The disk drive of claim 10, further comprising, synchronizing the fixed modulation frequency to a magnetic field produced by the write pole such that, during a period of time, the driver circuit modulates the radiation source such that the radiation source heats a portion of the magnetic media proximate to the write pole above a grain freezing temperature when an energy produced by the magnetic field exceeds the thermal energy ($k_BT$) of grains of the magnetic media.

16. The disk drive of claim 15, wherein, during a different period of time, the driver circuit modulates the radiation source such that the radiation source heats a portion of the magnetic media proximate to the write pole below a grain freezing temperature when an energy produced by the magnetic field is less than the thermal energy ($k_BT$) in a grain of the magnetic media.

17. The disk drive of claim 10, wherein, while being modulated at the fixed modulation frequency, the radiation source continuously keeps maintains a temperature of a portion of the magnetic media proximate to the write pole above a grain freezing temperature.

18. The disk drive of claim 10, wherein the fixed modulation frequency is characterized by one of: a substantially sinusoidal shape and a substantially sawtooth shape.

19. A driver circuit for modulating a radiation source configured to heat a magnetic media in a disk drive when performing thermal assisted recording, comprising:
    modulation circuitry configured to generate a signal to modulate the radiation source, wherein a modulation frequency of the radiation source is greater than a maximum data frequency at which a write pole writes data onto the magnetic media, and wherein, while the write pole writes data to the magnetic media, the modulation frequency is fixed; and
    biasing circuitry configured to bias the radiation source with a DC current thereby providing a DC bias to the modulation frequency.

* * * * *

UNITED STATES PATENT AND TRADEMARK OFFICE
CERTIFICATE OF CORRECTION

PATENT NO. : 8,570,842 B1
APPLICATION NO. : 13/490318
DATED : October 29, 2013
INVENTOR(S) : Richter et al.

Page 1 of 1

It is certified that error appears in the above-identified patent and that said Letters Patent is hereby corrected as shown below:

In the Claims:

Column 14, Claim 17, Line 43, please delete "keeps".

Signed and Sealed this
Eleventh Day of February, 2014

Michelle K. Lee
*Deputy Director of the United States Patent and Trademark Office*